(12) United States Patent
Kim et al.

(10) Patent No.: US 11,511,785 B2
(45) Date of Patent: Nov. 29, 2022

(54) CART ROBOT WITH AUTOMATIC FOLLOWING FUNCTION

(71) Applicant: LG ELECTRONICS INC., Seoul (KR)

(72) Inventors: Anna Kim, Seoul (KR); Sunryang Kim, Seoul (KR); Yoonsik Kim, Seoul (KR); Keunsik No, Seoul (KR); Jaecheon Sa, Seoul (KR); Woojin Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 288 days.

(21) Appl. No.: 16/862,306

(22) Filed: Apr. 29, 2020

(65) Prior Publication Data

US 2020/0346679 A1 Nov. 5, 2020

(30) Foreign Application Priority Data

Apr. 30, 2019 (WO) ................ PCT/KR2019/005216
Aug. 26, 2019 (KR) ........................ 10-2019-0104534

(51) Int. Cl.
*B62B 5/00* (2006.01)
*B62B 5/06* (2006.01)
*G05D 1/00* (2006.01)
*G05D 1/02* (2020.01)
*B62B 3/14* (2006.01)

(52) U.S. Cl.
CPC ............ *B62B 5/0076* (2013.01); *B62B 5/004* (2013.01); *B62B 5/0006* (2013.01); *B62B 5/0043* (2013.01); *B62B 5/0053* (2013.01); *B62B 5/0073* (2013.01); *B62B 5/06* (2013.01); *G05D 1/0011* (2013.01); *G05D 1/0214* (2013.01); *B62B 3/14* (2013.01); *G05D 1/0231* (2013.01)

(58) Field of Classification Search
CPC ..... B62B 5/0076; B62B 5/0006; B62B 5/004; B62B 5/0043; B62B 5/0053; B62B 5/0073; B62B 5/06; B62B 3/14; G05D 1/0011; G05D 1/0214; G05D 1/0231; G05D 2201/0216; G05D 1/028
See application file for complete search history.

(56) References Cited

U.S. PATENT DOCUMENTS 8,327,963 B1 * 12/2012 Faulkingham ............ B62B 3/04
180/9.1
9,643,638 B1 * 5/2017 Wittliff, III .......... G05D 1/0016
(Continued)

FOREIGN PATENT DOCUMENTS

CN 107963416 A * 4/2018 .............. B25J 5/007
CN 108357525 A * 8/2018 ............. B62B 3/001
(Continued)

*Primary Examiner* — James A Shriver, II
*Assistant Examiner* — Bryce Shelton
(74) *Attorney, Agent, or Firm* — Birch, Stewart, Kolasch & Birch, LLP

(57) ABSTRACT

A basket assembly for receiving goods therein; a main body coupled to a bottom of the basket assembly to support the basket assembly; a handle assembly installed on one side of the main body; a wheel assembly rotatably coupled to a bottom of the main body to move the main body in a direction in which a force is applied to the handle assembly; and a battery installed inside the main body for supplying electrical energy to the wheel assembly.

20 Claims, 9 Drawing Sheets

(56) References Cited

U.S. PATENT DOCUMENTS

| | | | |
|---|---|---|---|
| 10,239,544 B1* | 3/2019 | DeMartine | B61B 13/00 |
| 10,310,506 B1* | 6/2019 | Qi | A45C 15/00 |
| 10,493,624 B1* | 12/2019 | Nabat | B25J 13/085 |
| 11,020,858 B2* | 6/2021 | Amacker | B25J 11/008 |
| 11,086,328 B2* | 8/2021 | Keivan | G05D 1/0214 |
| 2007/0100498 A1* | 5/2007 | Matsumoto | G05D 1/024 701/23 |
| 2011/0010024 A1* | 1/2011 | Salisbury | G06F 3/014 701/2 |
| 2014/0217690 A1* | 8/2014 | Schumaker | B62B 5/00 280/47.35 |
| 2015/0032252 A1* | 1/2015 | Galluzzo | G05D 1/0248 700/218 |
| 2015/0066275 A1* | 3/2015 | Masaki | B62B 5/0073 180/19.1 |
| 2015/0144411 A1* | 5/2015 | Washington | B62B 9/005 180/167 |
| 2015/0202770 A1* | 7/2015 | Patron | G06Q 30/0265 901/50 |
| 2015/0205298 A1* | 7/2015 | Stoschek | B60Q 5/005 901/1 |
| 2017/0108860 A1* | 4/2017 | Doane | G08G 1/16 |
| 2017/0123428 A1* | 5/2017 | Levinson | G05D 1/0257 |
| 2018/0057034 A1* | 3/2018 | Deshpande | B62B 5/002 |
| 2018/0072212 A1* | 3/2018 | Alfaro | G05D 1/0212 |
| 2018/0118245 A1* | 5/2018 | Chung | B62B 5/0043 |
| 2018/0132966 A1* | 5/2018 | Désaulniers | A61B 90/50 |
| 2018/0143639 A1* | 5/2018 | Singhal | G06Q 30/0269 |
| 2018/0162433 A1* | 6/2018 | Jones | B62B 5/0036 |
| 2018/0208398 A1* | 7/2018 | Haveman | G05D 1/0291 |
| 2018/0210448 A1* | 7/2018 | Lee | G05D 1/0291 |
| 2018/0229748 A1* | 8/2018 | Nakamura | B62B 5/004 |
| 2018/0244294 A1* | 8/2018 | Ochiai | B62B 5/004 |
| 2018/0275663 A1* | 9/2018 | Sonoura | G05D 1/0088 |
| 2018/0335786 A1* | 11/2018 | Ding | G06V 40/10 |
| 2018/0364711 A1* | 12/2018 | Goldfain | G05D 1/0011 |
| 2019/0106167 A1* | 4/2019 | Niezgoda | B60K 7/0007 |
| 2019/0291760 A1* | 9/2019 | Nakaura | B62B 5/0006 |
| 2019/0329809 A1* | 10/2019 | Mackay | B60K 17/043 |
| 2019/0344699 A1* | 11/2019 | Radetzki | B60R 25/23 |
| 2020/0073402 A1* | 3/2020 | Brucker | G05D 1/0278 |
| 2020/0100846 A1* | 4/2020 | Huang | B62B 5/0076 |
| 2020/0142412 A1* | 5/2020 | Kajiyama | G05D 1/0255 |
| 2020/0159238 A1* | 5/2020 | Jacobsen | G01C 22/00 |
| 2020/0242544 A1* | 7/2020 | Galluzzo | B25J 19/021 |
| 2020/0270055 A1* | 8/2020 | Schuster | B62B 5/0033 |
| 2020/0293049 A1* | 9/2020 | De Castro | G05D 1/0088 |
| 2020/0307667 A1* | 10/2020 | Tang | B62D 63/02 |
| 2020/0333789 A1* | 10/2020 | Suzuki | G05D 1/0248 |
| 2020/0375093 A1* | 12/2020 | Matus | B60W 30/04 |
| 2021/0016816 A1* | 1/2021 | Schillinger | B62B 5/0069 |
| 2021/0056788 A1* | 2/2021 | Chen | A45C 13/18 |
| 2021/0339787 A1* | 11/2021 | Andersson | B60L 15/20 |
| 2022/0017010 A1* | 1/2022 | Taniguchi | B60Q 1/38 |

FOREIGN PATENT DOCUMENTS

| | | | | |
|---|---|---|---|---|
| FR | 2980436 A1 | * | 3/2013 | ............ A63B 55/61 |
| JP | 2006322838 A | * | 11/2006 | |
| JP | 2019-67215 A | | 4/2019 | |
| KR | 10-2009-0030158 A | | 3/2009 | |
| KR | 10-2011-0041228 A | | 4/2011 | |
| KR | 20110119438 A | * | 11/2011 | |
| KR | 10-2018-0067467 A | | 6/2018 | |
| KR | 20180067467 A | * | 6/2018 | |
| KR | 10-1961797 B1 | | 3/2019 | |
| WO | WO-2017042959 A1 | * | 3/2017 | .......... B62B 5/0073 |
| WO | WO-2018101962 A1 | * | 6/2018 | |
| WO | WO-2018213931 A1 | * | 11/2018 | ............. B25J 5/007 |
| WO | WO-2019027161 A1 | * | 2/2019 | .......... B62B 5/0076 |
| WO | WO-2019068405 A1 | * | 4/2019 | ............ B62B 3/001 |

* cited by examiner

[FIG. 1]
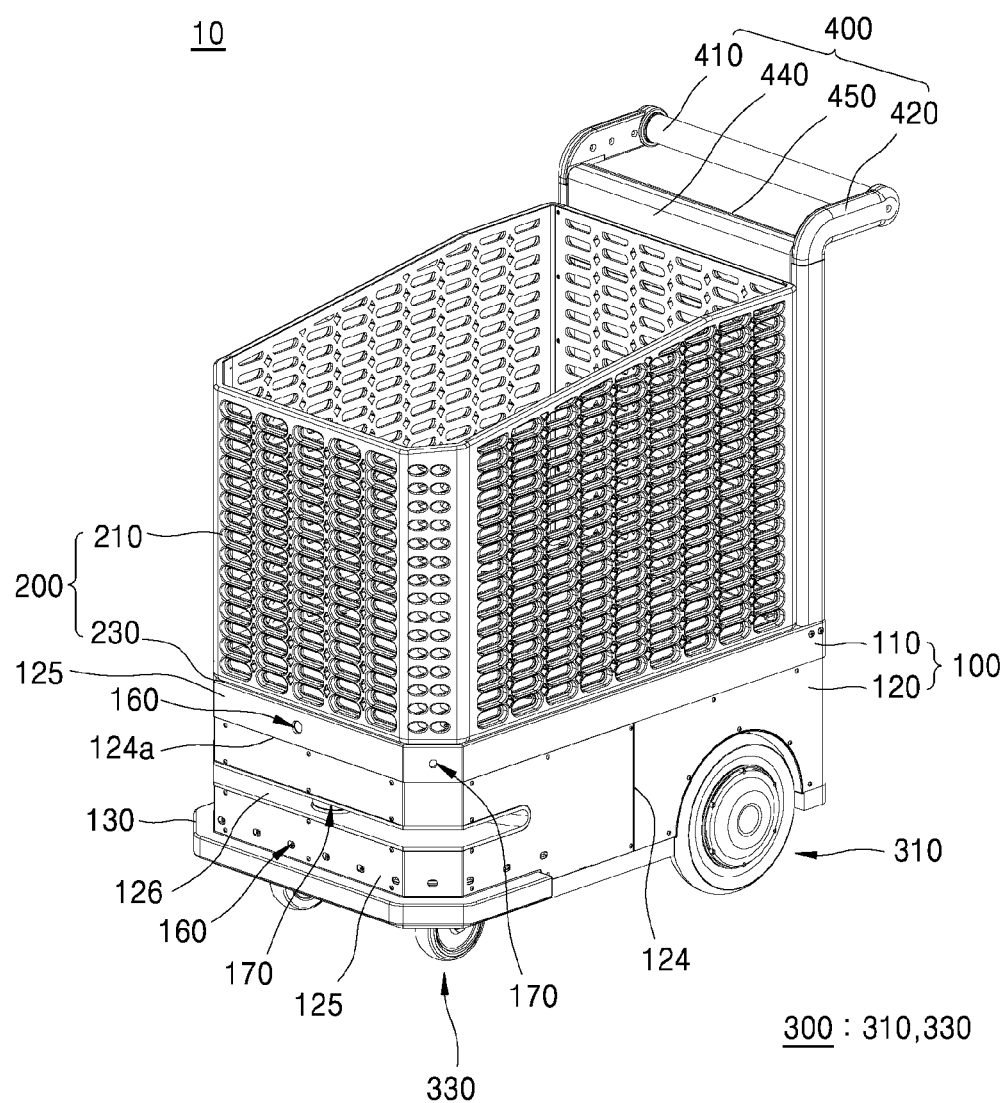

[FIG. 2]
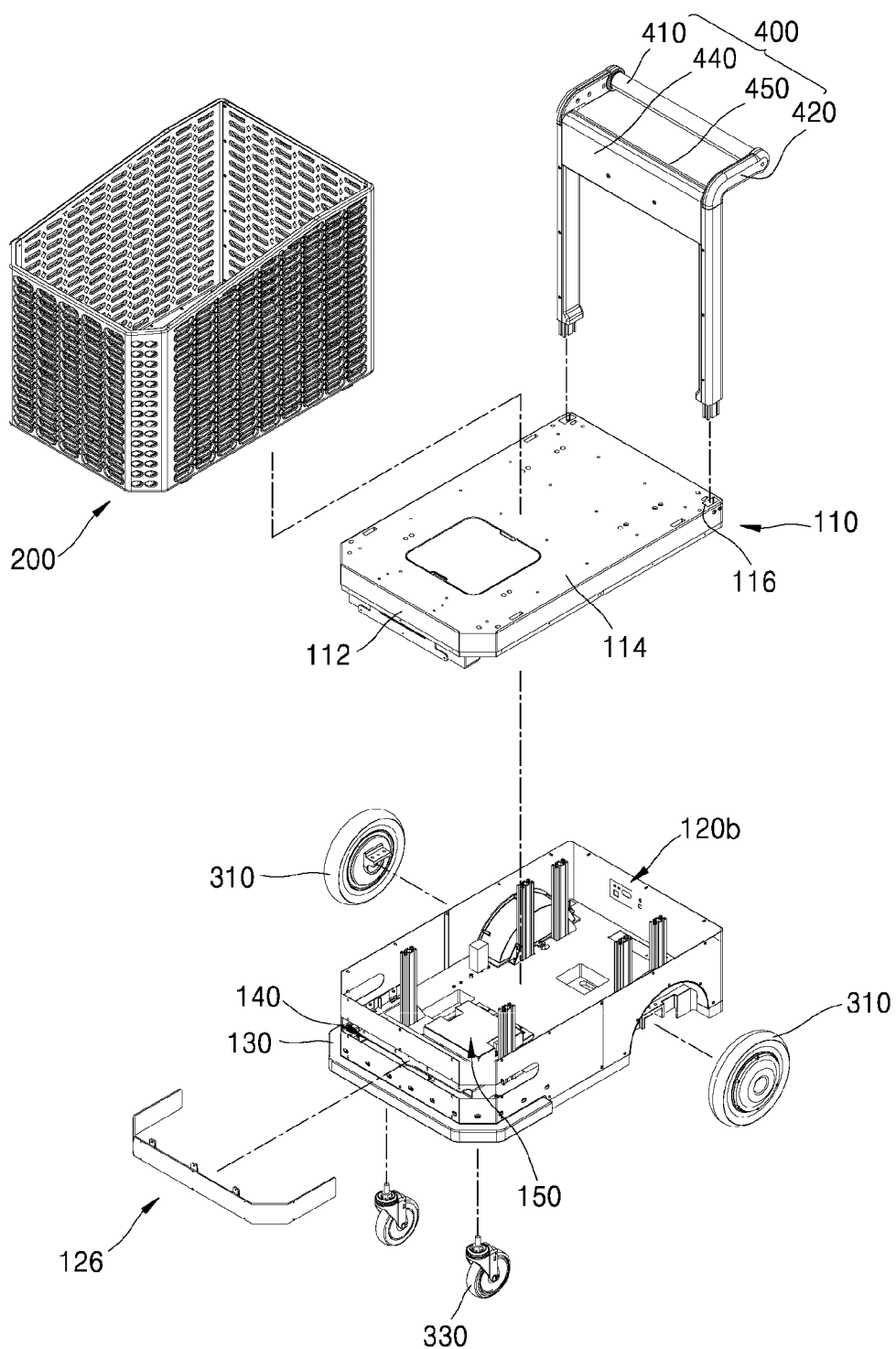

[FIG. 3]
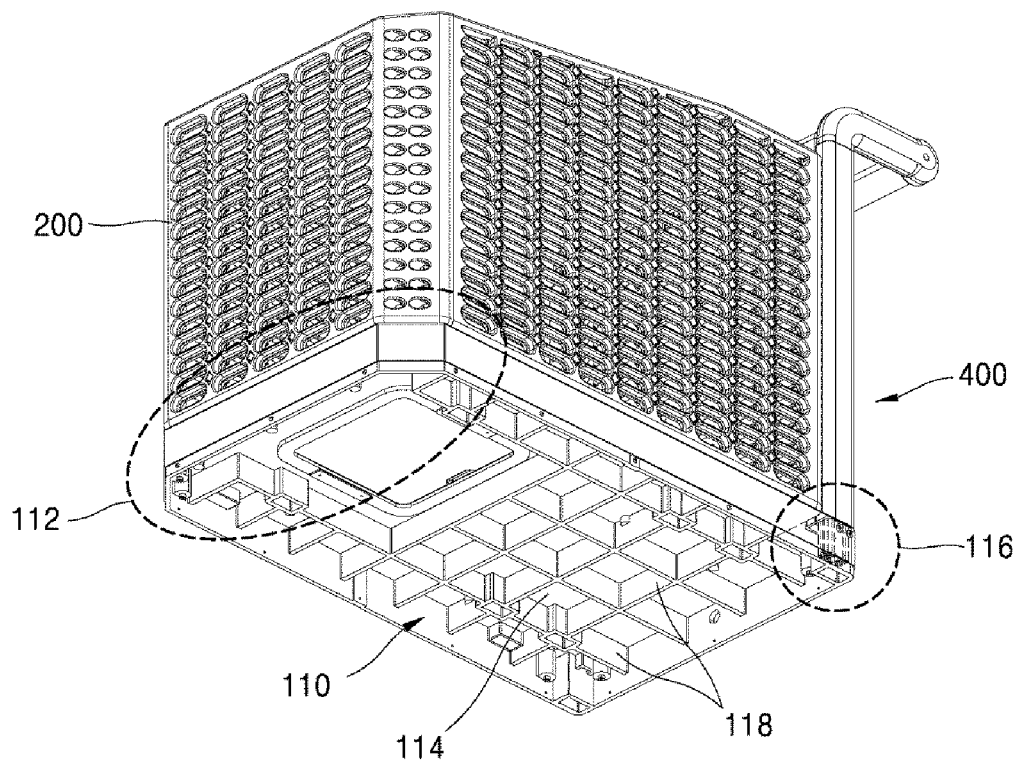

[FIG. 4]
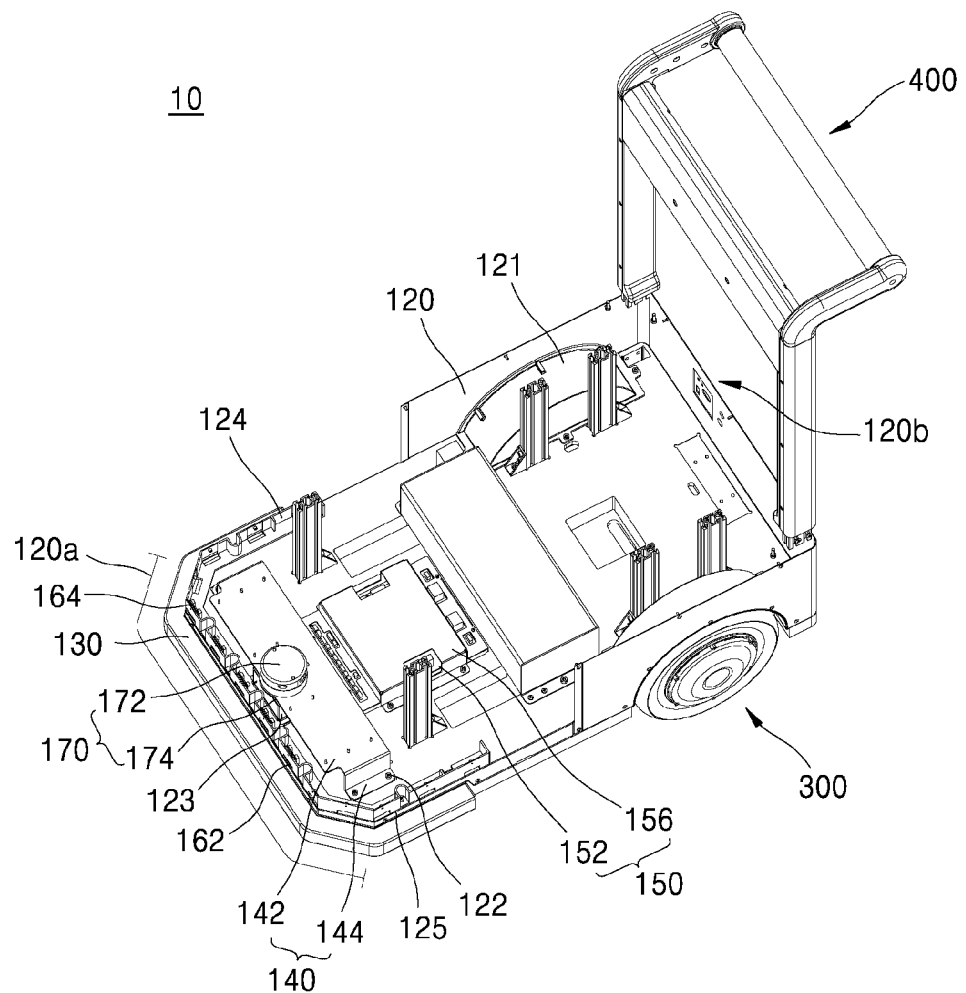
160 : 162, 164

【FIG. 5】
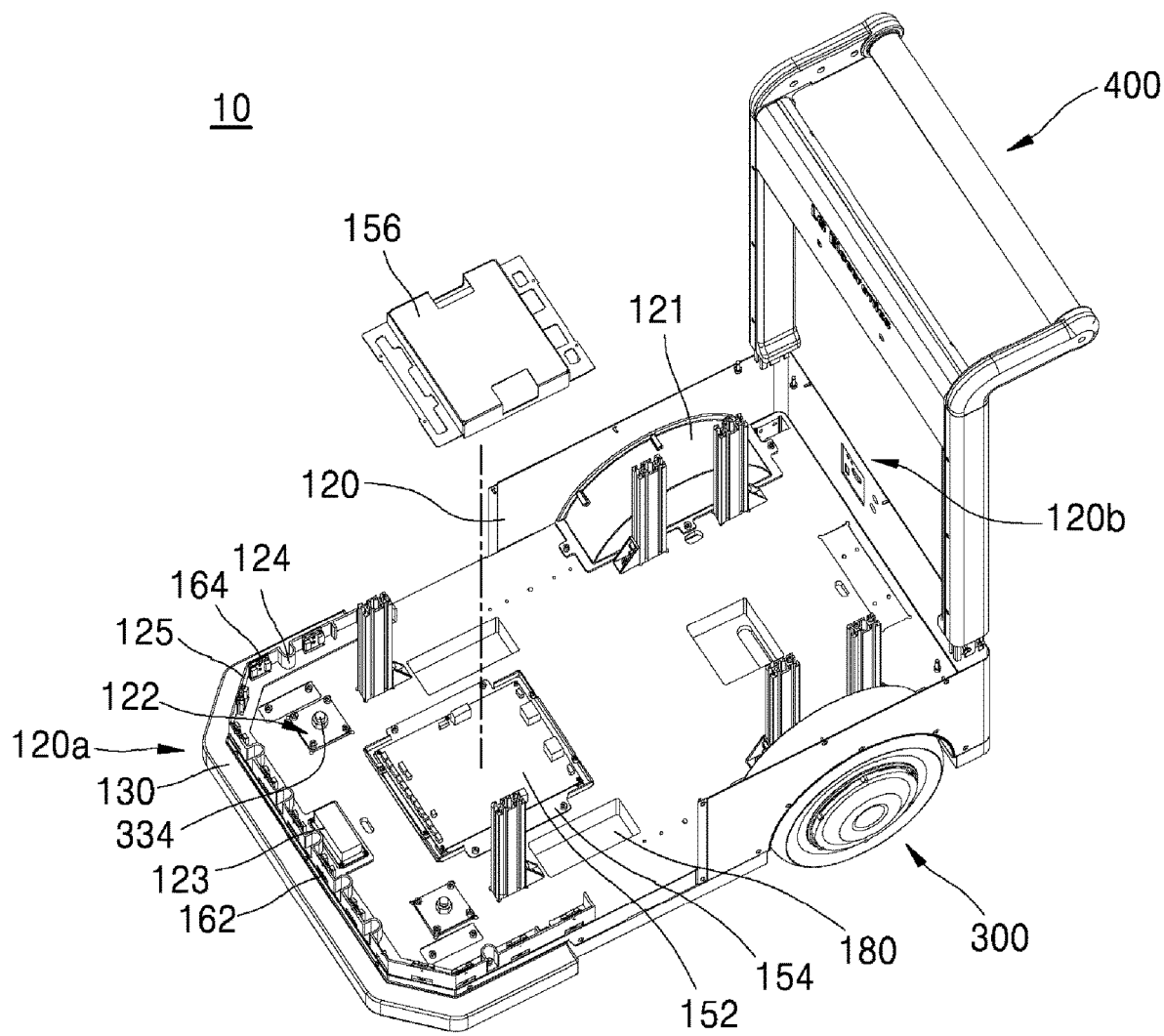
160 : 162, 164
150 : 152, 154, 156

[FIG. 6]
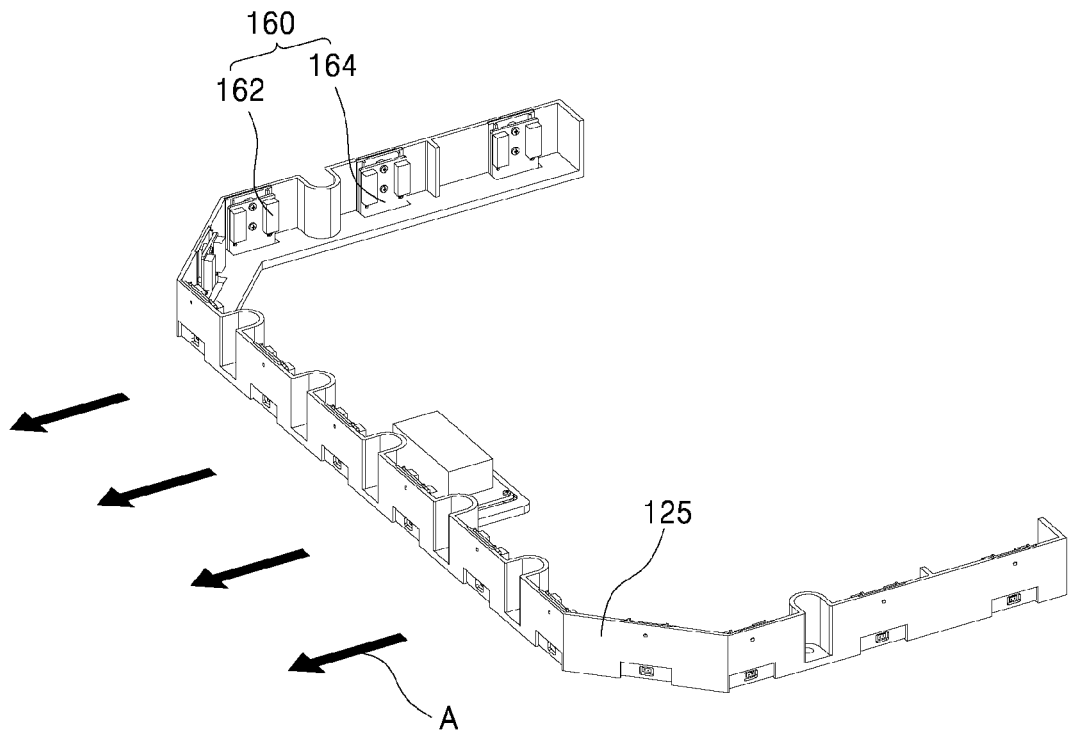
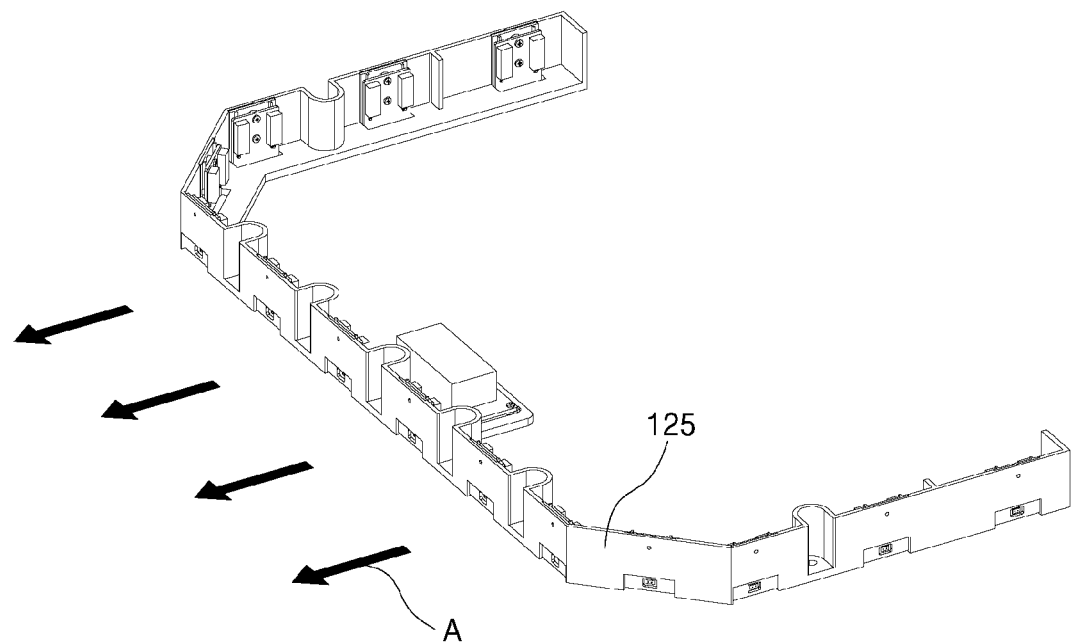

[FIG. 7]
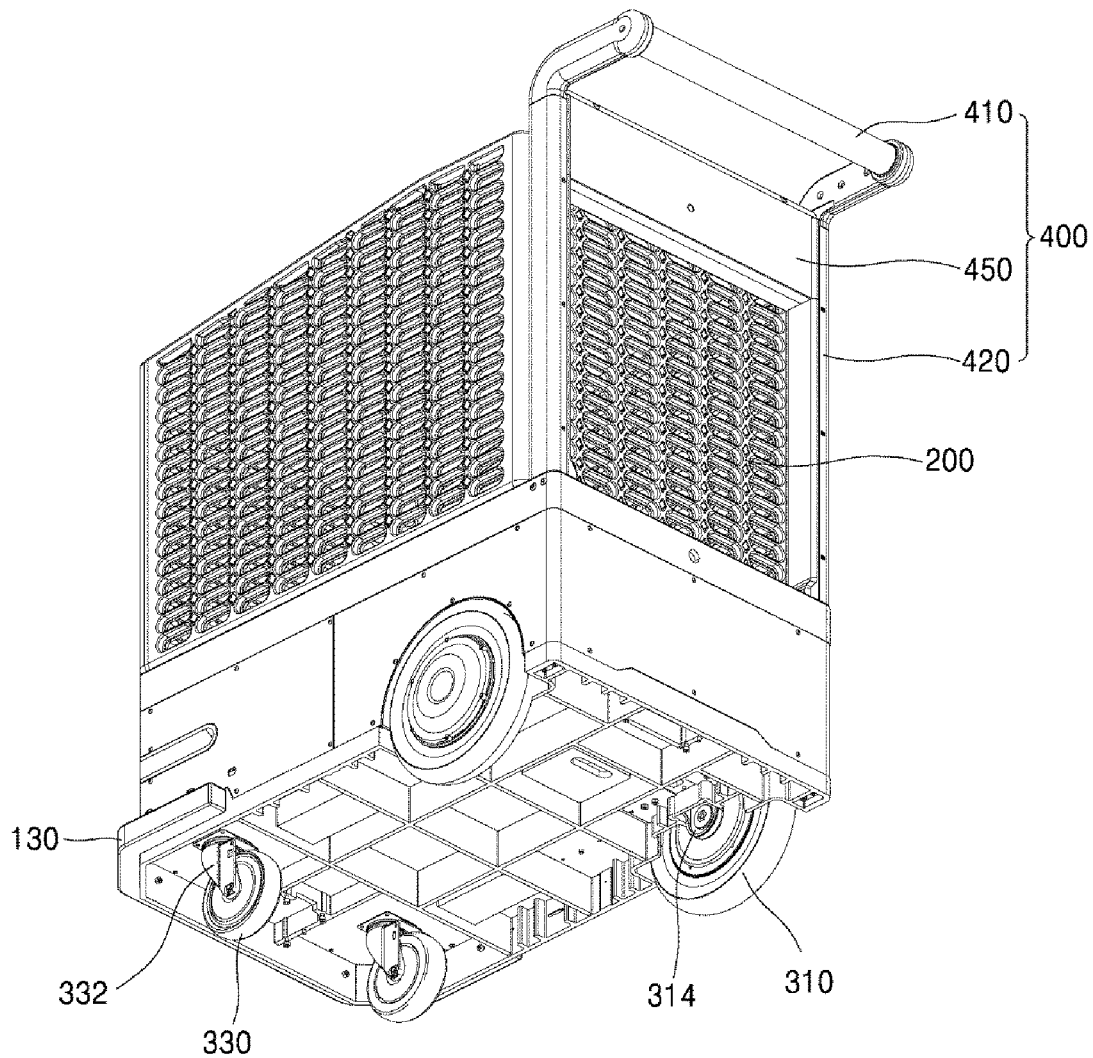

[FIG. 8]
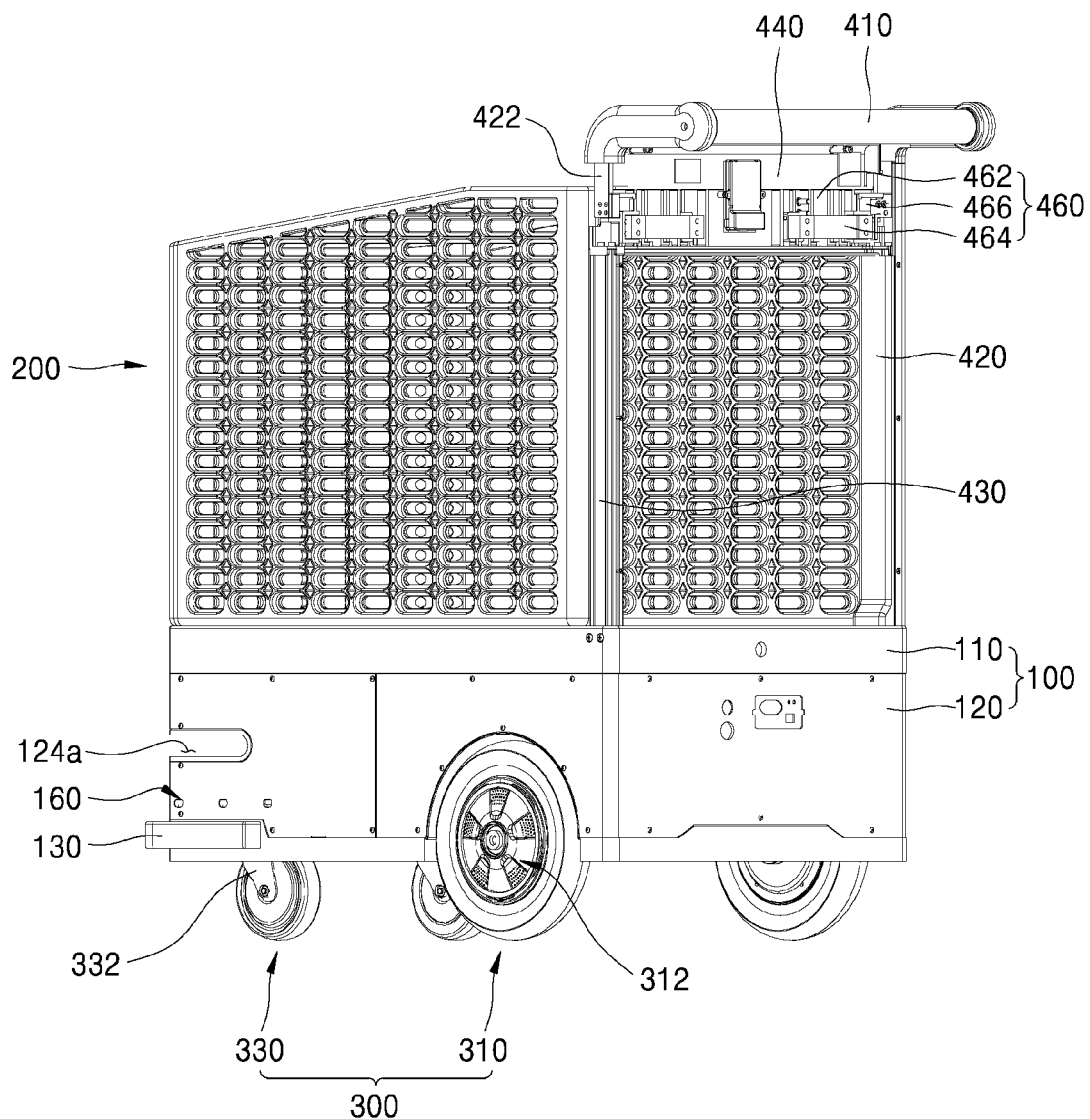

[FIG. 9]
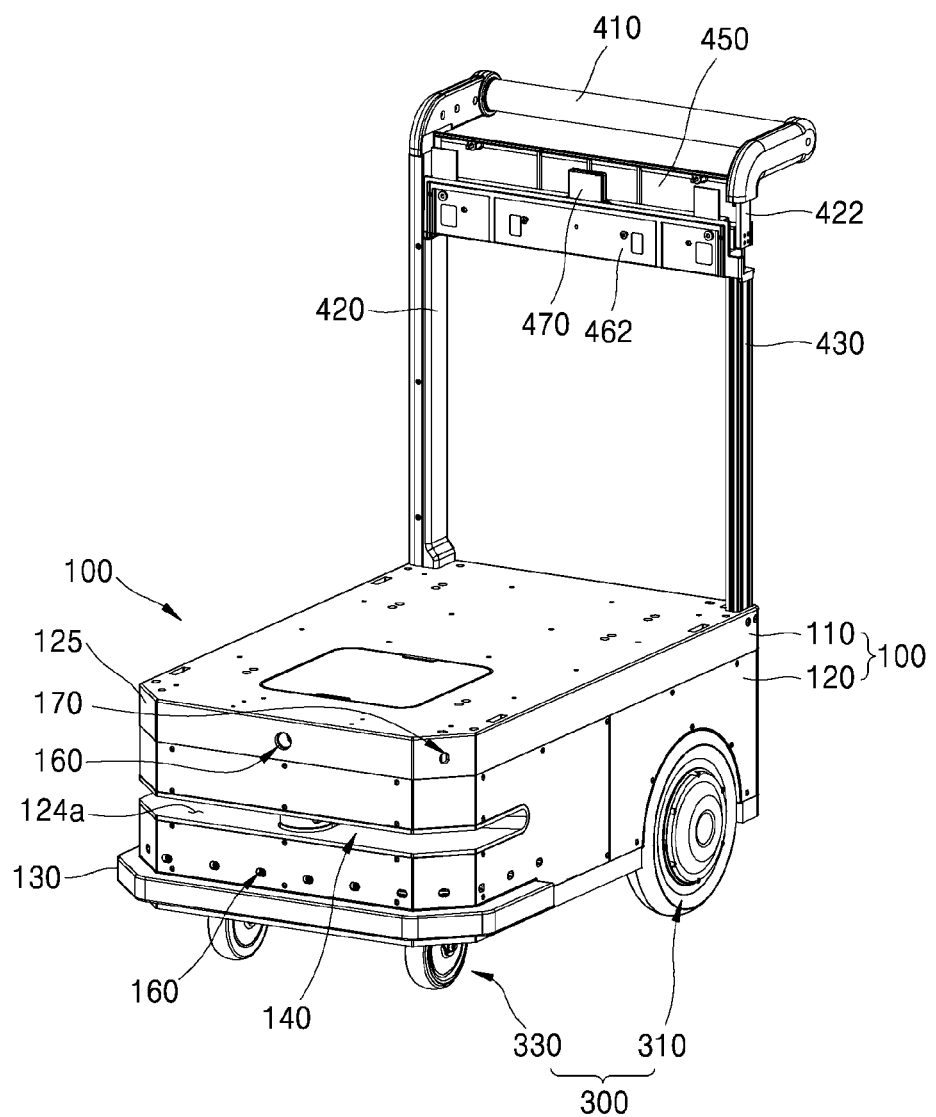

CART ROBOT WITH AUTOMATIC FOLLOWING FUNCTION

CROSS-REFERENCE TO RELATED APPLICATIONS

This application claims the priority benefit of International Application No. PCT/KR2019/005216 filed on Apr. 30, 2019, and Korean Patent Application No. 10-2019-0104534 filed in the Republic of Korea on Aug. 26, 2019, the disclosures of which are hereby incorporated by reference in their entireties.

BACKGROUND

1. Technical Field

The present disclosure relates to a cart robot having an automatic following function in which components thereof are arranged therein in an optimized manner to follow a user.

2. Description of the Related Art

In large-sized marts, department stores, and airports, various types of carts are used for users to carry heavy objects or luggage.

A cart used in a shopping space, such as a large mart or department store, has a structure in which a plurality of wheels is installed below a basket for storing objects therein, and the user moves the cart by pushing or pulling a handle. The cart is necessary for convenience of the user such that the user does not directly carry a large amount of objects or heavy objects.

Conventionally, the user handles the cart to move the cart. However, a distance between the cart and the user increases during the user checks goods of various items. This causes inconvenience that the user has to go back to the cart and move the cart or carry the object to the cart.

Therefore, there is a need to develop a method to solve the inconvenience of the user and to easily control movement or handling of the cart while the user moves freely.

Accordingly, recently, a robot for daily life that may provide various services has emerged. The robot for daily living provides a specific service, for example, shopping, transportation, serving, conversation, cleaning, etc. in response to a user's command.

However, a robot performing a cart function among conventional robots for daily life has only a function of ascending or descending a basket and a plate on which the basket is placed. Thus, use thereof has to be limited.

SUMMARY

One purpose of the present disclosure is to provide a cart robot having an automatic following function that may detect a location of a user and a movement path of the user and then follow the user based on the location and the movement path.

Further, another purpose of the present disclosure is to provide a cart robot having an automatic following function in which components thereof are arranged therein in an optimized manner to follow a user.

Furthermore, still another purpose of the present disclosure is to provide a cart robot with an automatic following function in which a basket is detached from a main body and a loading box or a luggage packaging member is removably attached to the main body, such that the cart robot is used as a cart for logistics transportation.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

One aspect of the present disclosure provides a cart robot comprising: a basket assembly for receiving goods therein; a main body coupled to a bottom of the basket assembly to support the basket assembly; a handle assembly installed on one side of the main body; a wheel assembly rotatably coupled to a bottom of the main body to move the main body in a direction in which a force is applied to the handle assembly; and a battery module (e.g., battery) installed inside the main body, the battery module being disposed adjacent to a front side of the main body.

In one implementation, the wheel assembly includes: a pair of main wheels rotatably coupled to both sides of a rear portion of a bottom of the main body respectively; an auxiliary wheel rotatably coupled to a bottom of a front portion of the main body; and an in-wheel motor mounted inside each of the main wheels, wherein each in-wheel motor receives power from the battery module and supplies a driving force to each main wheel.

In one implementation, the battery module is installed in a position corresponding to a position at which the auxiliary wheel is coupled to the main body.

In one implementation, the main body includes: a front portion having a convexly protruding shape in a front direction; and a rear portion having a concavely recessed shape in a front direction, wherein the handle assembly is coupled to the rear portion of the main body.

In one implementation, wherein the main body further includes: a main housing having an open top and an accommodation space defined therein; and an upper frame coupled to the open top of the main housing to cover the accommodation space, wherein when the main housing and the upper frame are coupled to each other, a slit is defined in a front side of the main body, wherein the slit has a vertical dimension corresponding to a predetermined vertical spacing between the main housing and the upper frame.

In one implementation, wherein the robot further comprises: a first sensor module (e.g., unit, assembly, etc.) including a plurality of sensors installed in a front side and at least a portion of each of left and right sides of the main housing, wherein the first sensor module detects an obstacle in front of the robot; a second sensor module (e.g., unit, assembly, etc.) spaced from the first sensor module to detect an obstacle; and a third sensor module (e.g., unit, assembly, etc.) installed on the upper frame to detect and track a location of a transmission module (e.g., unit, assembly, etc.), wherein the first to third sensor modules are arranged such that sensing ranges thereof do not overlap each other. That is, the first sensor module may have a different sensor range than the second sensor module and third sensor module, and the second sensor module may have a different range than the third sensor module.

In one implementation, the second sensor module is installed at a different vertical level from a vertical level of the first sensor module and is closer to a rear side of the main body than the first sensor module is.

In one implementation, the first sensor module includes a TOF (time of flight) sensor, the second sensor module includes a lidar sensor (light ranging and detecting), and the third sensor module includes a UWB (ultra-wideband) type positioning sensor.

In one implementation, the robot further comprises an elastic (e.g., elastically deformable) bumper coupled to and extending along the front side and at least a portion of each of right and left sides of the main housing, wherein the bumper has a front portion disposed in front of the first sensor module.

In one implementation, the bumper has the front portion, a left portion and a right portion, wherein the front portion is thicker than each of the left and right portions.

In one implementation, the handle assembly is disposed at a rear side of the main body, wherein the handle assembly includes: a handlebar for receiving a force exerted by a user; a pair of handle cover frames respectively coupled to both ends of the handlebar to support the handlebar; and a force sensing module including: a pair of load cells respectively installed on both sides below the handlebar to sense a magnitude and a direction of a force applied to the handlebar; a pair of connection frames for respectively connecting the load cells to the handlebar; and a support frame disposed between the handle cover frames and coupled to the load cells, wherein each load cell has one end coupled to the support frame as a fixed end, and has the other end coupled to each connection frame as a free end.

In one implementation, the main body further includes: a main PCB (printed circuit board) having a controller mounted thereon, wherein the main PCB is received inside the main housing, and communicate with the first to third sensor modules, and the force sensing module; and a cover casing covering a portion or an entirety of the main PCB.

In one implementation, the controller is configured to: determine a direction of the force applied to the handlebar by the user, based on a sensing result from the force sensing module; and control the in-wheel motor to supply an auxiliary force based on the determined direction.

In one implementation, the main body further includes an inner cover inserted into a space between the main housing and the upper frame to cover a portion or an entirety of the main housing.

In one implementation, first and second supports are formed on a top face of the upper frame, wherein the basket assembly is coupled to the first support, and the handle assembly is coupled to the second support.

In one implementation, the main housing includes: a wheel mount and a caster mount for mounting the wheel assembly thereon; a sensor mount for mounting at least one sensor module thereon; a step having a vertical level lower than a vertical level of a top of each of left and right faces of the main housing; and a sensor bracket for mounting at least one further sensor module thereon.

In one implementation, the controller is configured to control charging and discharging of a battery, analyze a detection result from the force sensing module, control whether to activate the in-wheel motor of the main wheel, control a transmitting direction of an auxiliary force generated from the in-wheel motor, and/or a corresponding rotation direction of the main wheel.

In one implementation, each main wheel is rotatably coupled to the main housing via each wheel bracket to support the main body and the basket assembly, wherein each main wheel contains an in-wheel motor therein, and is mounted on each of left and right sides of a bottom of a rear portion of the main body.

In one implementation, each wheel bracket has an 'L' shape, wherein each wheel bracket is disposed on an inner face of each main wheel, wherein one face of the wheel bracket is fixed to an outer face of the main housing, and the other face of the wheel bracket supports the main wheel to be rotatable.

In one implementation, the support frame has a plate shape, wherein each of the pair of load cells is coupled to each of both sides of the support frame such that the pair of load cells is supported on the support frame, wherein the other end of each load cell is coupled to each connection bracket via each connection frame.

Effects of the present disclosure may be as follows but may not be limited thereto.

The cart robot according to the present disclosure provides an automatic following function (e.g., may automatically follow a user of the cart robot) and a power assist function (i.e., for the user), so that the user may easily handle or control the cart robot, thereby greatly improving user convenience.

According to the present disclosure, the battery is disposed on a front side of the main body and, thus, a center of gravity thereof is located at a front location thereof. Thus, the cart robot is not pushed backward even when driving on an inclined moving walkway, thereby to avoid user inconvenience.

Furthermore, the cart robot in accordance with the present disclosure may detect obstacles, such as stands in a mart (or in another area where the cart robot is located) and persons, in a distinguishing manner, and, thus, automatically avoid the obstacles and persons when following a location of a transmission module, thus greatly improving user convenience.

In addition to the above-described effects, specific effects of the present disclosure will be described together while describing specific details for carrying out the disclosure.

BRIEF DESCRIPTIONS OF DRAWINGS

FIG. 1 is a perspective view showing a cart robot according to an embodiment of the present disclosure.

FIG. 2 is a partially exploded perspective view showing the cart robot according to FIG. 1.

FIG. 3 is a bottom perspective view showing some components of the cart robot in FIG. 1.

FIG. 4 is a perspective view showing an inside of a main body of the cart robot in FIG. 1.

FIG. 5 is a perspective view showing a portion of the interior of the main body in FIG. 4.

FIG. 6 is a perspective view showing a sensor bracket on which a first sensor module of a cart robot is mounted, according to an embodiment.

FIG. 7 is a rear perspective view of the cart robot in FIG. 1.

FIG. 8 is a rear perspective view showing main components of the cart robot in FIG. 7.

FIG. 9 is a front perspective view showing main components of the cart robot in FIG. 7.

DETAILED DESCRIPTION

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "cart robot" means a device for logistic delivery that moves manually or using electric power under user control. The cart robot may or may not include a function for storing objects therein. The cart robot may be used in shopping spaces such as large supermarkets, department stores, small and medium-sized stores, leisure spaces such as golf courses, and transportation spaces such as airports and ports, or any other type of area.

The cart robot in accordance with the present disclosure may be utilized not only as a shopping cart, but also as various types of movable robots having a user following function, such as a logistics cart robot.

FIG. 1 is a perspective view showing a cart robot according to an embodiment of the present disclosure. FIG. 2 is a partially exploded perspective view showing the cart robot according to FIG. 1. FIG. 3 is a bottom perspective view showing some components of the cart robot in FIG. 1. FIG. 4 is a perspective view showing an inside of a main body of the cart robot in FIG. 1. FIG. 5 is a perspective view showing a portion of the interior of the main body in FIG. 4. FIG. 6 is a perspective view showing a sensor bracket on which a first sensor module of a cart robot according to an embodiment is mounted. FIG. 7 is a rear perspective view of the cart robot in FIG. 1. FIG. 8 is a rear perspective view showing main components of the cart robot in FIG. 7. FIG. 9 is a front perspective view showing main components of the cart robot in FIG. 7. In describing the present disclosure, a portion in which a handle assembly is installed will be defined as a rear portion of the cart robot.

As shown in FIG. 1, a cart robot 10 according to an embodiment of the present disclosure includes a main body 100, a basket assembly 200 disposed on the main body 100, a wheel assembly 300 coupled to a bottom of the main body 100, and a handle assembly 400 that is coupled to a rear portion of the main body 100.

The main body 100 includes an upper frame 110 and a main housing 120, the upper frame 110 being coupled to the main housing 120. Several components are installed inside and outside the main body 100. The main body 100 has a front side thereof protruding convexly. That is, a front side of the main body 100 may have parts protruding in a rearward direction. In this connection, the front direction is a moving-forward direction of the cart robot and a rear direction is opposite to the front direction. Further, the main body 100 has a rear side, the rear side may be concave toward the front side, and may be shaped in consideration of easy walking of the user. Those shapes of the front and rear sides are equally applied to each of the upper frame 110 and the main housing 120. A third sensor module which will be described later is mounted on the upper frame 110, while a battery module 140, a main PCB module 150, a first sensor module 160 and a second sensor module 170 are mounted inside the main housing 120. A bumper 130 is mounted on the front side of the main housing 120 to protect the main body 100 in collision.

As shown in FIG. 1 and FIG. 2, the upper frame 110 is embodied as a plate having a predetermined thickness. The upper frame 110 may be made of insulating material (e.g., a thermal and vibration insulating material), such as plastic, so as not to affect performance of the sensors. The upper frame 110 has a sufficient thickness so that the third sensor module may be installed thereon. A sensor mount portion 112 is provided on a front side of the upper frame 110 such that the third sensor module is mounted thereon. A top face of the upper frame 110 is constituted by a first support 114 to which the basket assembly 200 is coupled, and a second support 116 to which the handle assembly 400 is coupled.

The upper frame 110 has a convex shape at the front side thereof and a concave shape at the rear side thereof. The front side of the upper frame 110 has an angled convex shape rather than a circular convex shape to correspond to a shape and characteristics of the third sensor module. The upper frame 110 is straight at the foremost side thereof and is inclined toward each of left and right sides thereof from the foremost side. That is, a shape of the front side of the upper frame 110 has an approximately 'U' shape and may have a flat central portion with side portions respectively extending from the flat central portion, the side portions extending at an angle with respect to the flat central portion.

The upper frame 110 has a shape of the rear side concave toward the front side in an approximately 'U' shape. Alternatively, the rear side of the upper frame 100 may be planar (e.g., may have a linear shape). This structure is intended for preventing a leg of the user from colliding with the main body 100 when the user pushes the cart robot 10 and walks. Therefore, when the user handles the cart robot 10, a leg of the user may be prevented from colliding with the main body 100, thereby to obtain an effect of preventing injury and improving user convenience.

Since the basket assembly 200 is installed on a top face of the upper frame 110, the upper frame 110 must be able to support a weight of several kg to several tens of kg. Therefore, the upper frame 110 may have a plurality of reinforcing ribs 118 on a bottom face thereof facing the main housing 120 (see FIG. 3).

The reinforcing ribs 118 protrude from the bottom face of the upper frame 110. The ribs 118 may be arranged in a regular or irregular manner and over an entire area (e.g., over the entre bottom face) of the upper frame 110. The upper frame 110 should be made of a non-metallic material or a non-conductive material so as not to affect the performance of the sensors. Therefore, it is preferable that the reinforcing ribs 118 are configured to reinforce the upper frame 110 and support a load of the basket assembly 200. The reinforcing rib 118 improves strength of the upper frame 110 while maintaining the sensor performance. The main housing 120 is coupled to the bottom of the upper frame 110.

As shown in FIG. 1 FIG. 2, FIG. 4 and FIG. 5, the main housing 120 has a predetermined height and has an accommodation space defined therein. The main housing 120 has a cylindrical shape having an open top, and the front side thereof is convex in a semicircle shape and the rear side thereof is concave toward the front side. The front convex portion thereof is defined as a front portion 120a and the rear portion (which may be concave or have a rectilinear shape) thereof is defined as a rear portion 120b. The main housing 120 may extend from a semicircular front side to each of left and right sides in a streamlined curved shape. This structure is intended to prevent interference or collision with the user when the user moves.

Inside the main housing 120, a wheel mount 121 and a caster mount 122 for mounting the wheel assembly 300 thereon, and a sensor mount 123 for mounting the second sensor module 170 thereon are disposed. A step 124 having a vertical level smaller than that of a top of each of left and right faces is formed on the front portion 120a of the main housing 120. A sensor bracket 125 for mounting the first sensor module 160 thereon is installed on a top face of the step 124. A portion of the open top of the main housing 120 is blocked by an inner cover 126 to prevent parts from being exposed to an outside.

The wheel mount 121 refers to a part on which a main wheel 310 of the wheel assembly 300 to be described later is mounted. The wheel mount 121 has a shape corresponding to a shape of the main wheel 310 and is convex from a bottom face of the main housing 120. The main wheel 310 is rotatably coupled to an outer face of the wheel mount 121.

The wheel mount 121 is preferably sized so as not to interfere with driving of the main wheel 310.

The caster mount 122 refers to a part on which an auxiliary wheel 330 (e.g., a caster wheel) of the wheel assembly 300 is mounted. The caster mount 122 is formed at a position corresponding to a position of the auxiliary wheel 330. A bracket fixing part 334 coupled to the auxiliary wheel 330 is coupled to the caster mount 122. The caster mount 122 may be coupled to the bracket fixing part 334 in a press fitting manner or using a separate fastening member.

The sensor mount 123 refers to a part to which the second sensor module 170 to be described later is coupled. The sensor mount 123 may be embodied in a bracket or a case form or as a plurality of bosses as illustrated in the drawing. The sensor mount 123 is disposed adjacent to the front portion 120a of the main housing 120. The sensor mount 123 is formed to have a predetermined height so that a portion of the second sensor module 170 may be exposed through a slit 124a which will be described later.

The step 124 having a vertical level lower than that of the top of each of the left and right faces is formed on the front portion 120a and each of the left and right faces of the main housing 120. The bumper 130 is mounted to an outer face of the step 124, and the sensor bracket 125 is coupled to a top face of the step 124.

The sensor bracket 125 extends on and along a top face of the step 124 and is embodied as an elongate plate with a predetermined width. In this connection, the sensor bracket 125 may be shaped in a "U" form such that a front face corresponding to a sensing direction as indicated by an arrow A is flat. Alternatively, the sensor bracket 125 may be shaped such that a front face corresponding to a sensing direction as indicated by an arrow A is semi-circular curved. Hereinafter, an example in which a front face corresponding to a sensing direction as indicated by an arrow A is flat will be described.

The sensor bracket 125 is integrally formed with the main housing 120 or is separately formed from and then coupled to the main housing 120. The sensor bracket 125 has a vertical level lower than that of a top of each of the left and right faces of the main housing 120 when the sensor bracket is mounted on the main housing 120. Therefore, a gap is formed between a bottom of the upper frame 110 and a top of the sensor bracket 125 when the upper frame 110 and the main housing 120 are combined with each other. This gap is defined as the slit 124a.

A plurality of first sensor modules 160 are mounted on the sensor bracket 125. To this end, the number of through-holes corresponding to the number of the first sensor modules 160 may pass through a plate of the sensor bracket 125. The bumper 130 is mounted on an outer face of the sensor bracket 125, and a sensor PCB 164 of the first sensor module 160 is installed on an inner face thereof.

The slit 124a acts as an essential space such that operation of the second sensor module 170, which will be described later, is not disturbed. The slit 124a may be formed in a corresponding manner to a detection range in which the second sensor module 170 may detect an object. The second sensor module 170 which will be described later may be capable of detecting an object in a 360° omnidirectional range. However, the cart robot 10 according to the present disclosure does not need to detect an obstacle to the rear of the cart robot 10 because the user moves (e.g., is positioned) in rear of the cart robot 10. Therefore, the slit 124a may be partially formed only in the front and left and right sides of the cart robot 10, when necessary, the slit 124a may extends along an entirety of each of the left and right sides of the cart robot 10.

The inner cover 126 may extend from an inner front face of the main housing 120 toward a rear side thereof, and may bend upwards from a rear the side of the second sensor module 170 toward the upper frame 110. That is, the inner cover 126 may cover ⅓ to ½ of an inner space of the main housing 120. However, the inner cover 126 is disposed at a position lower than that of the slit 124a so as not to affect the sensing (i.e., operation of the second sensor module 170), and is sufficiently separated from the first sensor module 160 and the second sensor module 170. The inner cover 126 may allow an exterior appearance of the cart robot 10 to be clean and may prevent foreign substances from entering inner parts of the cart robot 10.

The bumper 130 refers to a part that absorbs impact when the cart robot 10 collides, and is made of an elastic material (e.g., a material that is capable of elastically deforming) and may have a preset thickness. The bumper 130 is installed to wrap (i.e., wraps) the front portion 120a of the main housing 120 and is disposed out of the main housing 120. That is, the bumper 130 may include at least a portion that extends outwardly from the main housing 120, and the entirety of the bumper 130 may extend outwardly from the main housing 120. The bumper 130 may extend along the front portion 120a and a portion of each of the left and right sides of the main housing 120.

The bumper 130 protects the main housing 120 and internal parts of the cart robot 10 in event of a collision of the cart robot 10, and, thus protrudes from the main body of the cart robot 10 in a front direction. Further, the bumper 130 may be configured such that each of left and right sides thereof has a thickness smaller than that of a front side thereof to prevent interference with surroundings when the cart robot 10 moves. Since the bumper 130 protrudes from the main body of the cart robot 10 in the front direction, the parts accommodated inside the main housing 120 and the basket assembly 200 are protected from direct collision with surrounding objects, thereby improving durability of the parts.

In one example, the parts mounted inside the main housing 120 include the battery module 140, the main PCB module 150, and the first sensor module 160 to third sensor module. The inner cover 126 may be constructed to expose the first sensor module 160 and the second sensor module 170 to the outside for obstacle detection, but to shield the battery module 140 and the main PCB module 150.

As shown in FIG. 4, the battery module 140 is disposed on a bottom face of the main housing 120 and adjacent to the front portion 120a of the main housing 120. The battery module 140 is composed of a battery 142 and a battery casing 144 coupled to the bottom face of the main housing 120. The battery casing 144 may be detachably coupled to the main housing 120. The battery 142 may be detachably coupled to the battery casing 144 or may be permanently coupled to the battery casing 144.

The battery module 140 is installed in a position corresponding to a position of the caster mount 122. Since the second sensor module 170 is disposed in front of the battery module 140, the battery module 140 is positioned in a biased manner to the front side of the main housing 120 as much as possible while not interfering with the second sensor module 170.

When the user rides on an upward moving walkway, the cart robot 10 may be pushed backwards due to a weight of the cart robot 10 or a weight of items stored in the cart robot 10. However, in accordance with the present disclosure, when the battery module 140 is positioned to be biased to the front side of the main housing 120 so that a center of gravity of the cart robot 10 is located further to a front position. Therefore, the cart robot 10 may be prevented from being pushed backward while riding one the upwardly moving walkway, thereby improving user convenience and stability.

The battery 142 is electrically connected to a controller in the main PCB 152 and the main wheel 310. The main PCB module 150 may include the main PCB 152 and a cover casing 156. Charging and discharging of the battery 142 is controlled by the controller in the main PCB 152, which may be a known battery management system (BMS) and which will be described later. The battery 142 serves to supply electrical energy to the main wheel 310 and the main wheel 310 supplies an additional force (e.g., propulsion) to the cart robot 10. When the electrical energy is fed to the main wheel 310, an additional force is added to the cart robot 10 in a direction in which the user applies a force thereto, so that the user may easily move the cart robot 10. That is, the main wheel 310 supplies an assist force to reduce the effort needed by a user to move the cart robot 10. A function of supplying the assisting force required to move the cart robot is defined as a 'power assist' function as used herein.

As shown in FIG. 4 and FIG. 5, the main PCB module 150 may include the main PCB 152, which is equipped with components for various controls, a mount frame 154 that is coupled to the main PCB 152 to connect the main PCB 152 to the main housing 120, and a cover casing 156 that covers the main PCB 152. A main system OS module may be integrally installed in the main PCB module 150. Alternatively, the main system OS module may be installed on a separate OS mount 180.

The main PCB 152 has various components for control as mounted thereon. A collection of the components is defined as a controller for convenience. The controller 152 may determine a direction of the force as exerted by the user using a force sensing module 460 which will be described later, and may control the cart robot 10 to move in the corresponding direction. The controller 152 may control charging and discharging of the battery 142, perform analysis of detection results from the force sensing module 460, control whether to operate the in-wheel motor(s) 312 of the main wheel 310, and control a direction of transmission of the auxiliary force generated from the in-wheel motor 312, and, thus, a direction of rotation of the main wheel 310.

For example, when it is detected that the user intends to move forward, the controller may generate power by operating the in-wheel motor 312 and then control a transmission direction of a driving force such that the main wheel 310 rotates in a clockwise manner (forward movement of the cart robot 10). Conversely, when it is sensed that the user intends to move backwards, the controller may operate the in-wheel motor 312 to generate power and then control the transmission direction of the driving force so that the main wheel 310 rotates in a counter-clockwise manner (backward movement of the cart robot).

To this end, the controller communicates with and controls the force sensing module 460 and the in-wheel motor 312. Further, the controller 152 may directly control the rotation direction of the main wheel 310. After connecting the in-wheel motor 312 and the main wheel 310 with each other, the controller 152 may control the power transmission direction from the in-wheel motor 312 to control the rotation direction of the main wheel 310.

The cover casing 156 protects the main PCB 152 and shields EMI (Electro Magnetic Interference). As shown in FIG. 4, the cover casing 156 may be constructed to expose a portion of the main PCB 152, or to shield an entirety of the main PCB 152 so that the main PCB 152 is not exposed to the outside.

As shown in FIG. 1 to FIG. 4, the first sensor module 160 is mounted on the sensor bracket 125 and may include a plurality of first sensors. The first sensor module 160 is used to detect obstacles in front of the cart robot 10 and on a side thereto. The first sensor module 160 may detect a bottom of a goods stand as a fixed obstacle among the obstacles.

Goods stands may have different heights or sizes. However, vertical levels of bottoms thereof may be equal to each other. Thus, the first sensor module 160 may be positioned to detect the bottom of the goods stand.

The first sensor module 160 includes a TOF (time of flight) sensor 162 as a light sensor and a sensor PCB 164 for controlling the TOF sensor 162.

The TOF sensor 162 emits light from a light source toward an object and then measures a time duration for which the light is emitted and then reflected back from the object and then calculates a distance between the sensor and the object based on the time duration. The TOF sensor 162 may present or sense an object in a three dimensional manner when combined with a camera. The TOF sensor 162 has advantages that a sensing process and control thereof are simple, and a recognition ability is good in a bright light environment because the sensor is not interfered with external light.

The TOF sensor 162 is mounted on the sensor bracket 125. A plurality of TOF sensors 162 may be arranged to be spaced from each other at a predetermined spacing or with any a random spacing. In accordance with the present disclosure, the TOF sensor 162 can detect items, such as a bottom of stand (e.g., a goods stand) installed in a shopping space, such as a mart. The cart robot 10 may use the detections of the items via the TOF sensor 162 to avoid the items, such as by controlling the in-wheel motors 312 of the main wheels to move the cart robot. This may prevent the collision of the cart robot 10 with the stand when the cart robot 10 automatically moves while following the user.

The sensor PCB 164 is connected to the TOF sensor 162 to control the TOF sensor 162. Further, a measurement result from the TOF sensor 162 is transferred to the controller of the main PCB 152. To this end, the sensor PCB 164 is electrically connected to the TOF sensor 162 and the main PCB 152 and communicates therewith. The sensor PCB 164 may be coupled to the sensor bracket 125 using a separate fastening member or the like, or may be coupled to the sensor bracket 125 while being inserted into a coupling groove defined in the bracket 125. The second sensor module 170 is installed at a position such that the second sensor module 170 is not interfered by the first sensor module 160.

As shown in FIG. 1 to FIG. 4, the second sensor module 170 is installed adjacent to the front portion 120a of the main housing 120, but is disposed between the first sensor module 160 and the battery module 140. Further, the second sensor module 170 is positioned at a different vertical level from that of the first sensor module 160 so that the second sensor module 170 is not interfered with the first sensor module 160 in a detection range thereof. To this end, the aforementioned sensor mount 123 is provided, and the second sensor module 170 is mounted on the sensor mount 123. The second sensor module 170 includes a lidar sensor, a sensor case 172 accommodating the lidar sensor therein, and a sensor PCB 174 for controlling the lidar sensor.

The lidar sensor is housed inside the sensor case 172. The lidar sensor radiates a laser beam to an object to be sensed and measures a time duration for which the laser beam is emitted therefrom and is then reflected from the object to the lidar sensor and then measure a distance from the sensor to the object, based on the time duration. Since the lidar sensor uses the laser beam, a positional accuracy thereof is very high, and the sensor senses the object over a range of 360 degrees.

However, as described above, in accordance with the present disclosure, detection of an obstacle in rear of the robot is unnecessary. Thus, the slit 124a, which allows the lidar sensor to detect the object, is formed only in the front side and in a portion of each of the left and right side of the main housing 120. However, the slit 124a may be formed on any side and at any position of the main housing 120. Thus, when necessary, the slit 124a may be formed in the front and rear sides and the left and right sides of the main housing 120 and the lidar sensor may be configured to sense the 360 degrees range.

The sensor PCB 174 is electrically connected to the lidar sensor to control the lidar sensor, and transmits the detection result to the controller of the main PCB 152. To this end, the sensor PCB 174 may be electrically connected to the lidar sensor and the main PCB 152 and may communicate therewith.

In one example, the third sensor module may be additionally provided. The third sensor module is mounted on the sensor mount portion 112 of the upper frame 110 as described above and is not exposed to the outside. The third sensor module may be composed of a UWB (ultra-wideband) type positioning sensor, a camera, and/or a control board 470 (see FIG. 8), etc.

The positioning sensor tracks a position of a transmission module carried by the user, and a detection result from the positioning sensor may be transmitted to the controller 152 via a control PCB. When the automatic following function is used, the controller may allow the cart robot 10 to follow the user based on the detection result of the positioning sensor. In this way, the cart robot 10 may automatically follow the user. In accordance with the present disclosure, a function in which the cart robot 10 automatically follows the user based on the movement of the user equipped with the transmission module is defined as an 'automatic following' function or a 'user following' function.

Each of the first sensor module 160 to third sensor module as above-described may be disposed in the main housing 120 to exert an optimum effect while not affecting sensing of other sensor modules.

In order to maximize and minimize sensitivity and noise of an antenna respectively, the positioning sensor of the third sensor module is placed at a front most position of the main housing 120 compared to the TOF and lidar sensors, but is positioned behind the bumper 130, such that the sensor is protected. The camera of the third sensor module may be spaced apart from the positioning sensor. The first sensor module 160 equipped with the TOF sensor 162, as the optical sensor may be closer to the rear side of the main body 100 than the camera may be, and may be closer to the front side thereof than the lidar sensor may be. When the lidar sensor has a vertical level different from those of other sensors, the detection function of the lidar sensor is not affected by the other sensors. Thus, the lidar sensor may be installed at a position corresponding to the position of the slit 124a.

The cart robot 10 according to the present disclosure having the above-described configuration has the basket assembly 200 disposed on a top face of the main body 100, the wheel assembly 300 disposed on a bottom face of the main body 100, and the handle assembly 400 disposed at a rear side of the main body 100.

As shown in FIG. 1 to FIG. 3, the basket assembly 200 is coupled to a top of the main body 100 and has a receiving space for receiving goods therein. The basket assembly 200 includes a basket 210 in which goods are received, and a support bracket 230 that couples the basket 210 to the main body 100.

The basket 210 has an open top and a closed bottom. Front, rear, left and right walls thereof have a mesh structure. The support bracket 230 is coupled to the closed bottom of the basket 210. However, the basket 210 may have the closed bottom, and the closed front, rear, left and right walls. The basket 210 may be made of an insulating material, such as plastic, so as not to affect the performance of the surrounding sensors.

The support bracket 230 is embodied as a bar type structure with one end parallel to a bottom face of the basket 210 and the other end parallel to the upper frame 110 of the main body 100. The support bracket 230 may have a 'U' shape in which one end and the other end thereof are bent in the same direction. Alternatively, one end and the other end thereof may be bent in different directions. One end of the support bracket 230 is coupled to an outer face of the bottom of the basket 210, and the other end thereof is coupled to a top face of the upper frame 110. The support bracket 230 is coupled to the basket 210 and upper frame 110 using fastening members such as bolts. Thus, the basket 210 may be fixed to the main body 100 via the support bracket 230.

Alternatively, the basket 210 may be detachably coupled to the main body 100 via a hook or a fixing structure that is elastically deformed. Alternatively, a protrusion vertically protrudes from the basket 210 and a guide rail is formed in a vertically extending structure of the handle assembly 400 such that the protrusion is slidably coupled to the guide rail. In this way, the basket 210 may be coupled to the handle assembly 400 in a slidable manner. Alternatively, a projection may be formed on an outer face of a bottom of the basket 210 and a guide rail may be defined in the top face of the upper frame 110 so that the projection is slidably coupled to the guide rail. In this way, the basket 210 may be coupled to the main body 100 in a slidable manner. That is, a configuration in which the basket 210 is detachably attached to the main body 100 may be applied without limitation.

As shown in FIG. 1, FIG. 7 and FIG. 8, the wheel assembly 300 is disposed below the main housing 120 to support the main housing and the basket of the cart robot 10.

The wheel assembly 300 may include a pair of main wheels 310 and a pair of auxiliary wheels 330.

Each of the main wheels 310 is mounted on a respective side of a rear portion of the bottom of the main body 100. The main wheels 310 movably supports the main housing 100 and the basket 210 of the cart robot 10, and an in-wheel motor 312 is mounted inside each main wheel 310. The main wheel 310 is rotatably coupled onto the main housing 120 via a wheel bracket 314. The main wheel 310 may be rotated manually when the user pushes the cart robot 10 or may be rotated semi-automatically or automatically when receiving a rotational force from the in-wheel motor 312. Since the main wheel 310 acts as means for movably supporting the cart robot 10, the main wheel may have a size several times larger than that of the auxiliary wheel 330.

Each in-wheel motor 312 is directly connected to the respective main wheel 310, and receives power from the battery 142 to generate a driving force to rotate the main wheel 310. The main wheel 310 is controlled to be activated only when the power assist function is activated, and adds an auxiliary force to the main wheel 310 to assist the user to easily move the cart robot 10. The in-wheel motor 312 communicates with the controller of the main PCB 152 and is controlled by the controller.

Each wheel bracket 314 is disposed on an inner face of the respective main wheel 310. The wheel bracket 314 can be formed in an approximately 'L' shape, but can have any shape. One (a first) face thereof is fixed to an outer face of the bottom of the main housing 120. The other (a second) face of the wheel bracket 314 supports the main wheel 310 to be rotatable.

The auxiliary wheel 330 has a smaller size than a size of the main wheel 310, and is disposed adjacent to the front side of a bottom of the main housing 120. The auxiliary wheel 330 balances the positioning of the main body 100 so that the main body 100 does not tilt forward when the cart robot 10 moves. The auxiliary wheel 330 is rotatably supported by the caster bracket 332. The caster bracket 332 is coupled to the main housing 120 via a bracket fixing part 334.

The caster bracket 332 rotatably supports the auxiliary wheel 330 on both side faces thereof. The bracket fixing part 334 rotatably supports the caster bracket 332 on a top thereof. The caster bracket 332 and the bracket fixing part 334 may allow the auxiliary wheel 330 to be rotated in front and rear directions and to be pivoted in left and right directions so that the moving direction of the cart robot 10 may be changed. In accordance with the present disclosure, the main wheel 310 is only capable of rotating in the front and rear directions. Thus, the moving direction change of the cart robot 10 may be realized via the auxiliary wheel 330. This movement direction change may be achieved via the user manipulating the handle assembly 400.

The handle assembly 400 is provided at a rear side of the main body 100 and the basket assembly 200. The handle assembly 400 may be coupled to the basket assembly 200 and may be coupled to the main body 100. The handle assembly 400 includes a handlebar 410 that is gripped by the user, a handle cover frame 420 that supports the handlebar 410, and a handle support frame 430 that is inserted into the handle cover frame 420 to support the handlebar 410. Left and right handle cover frames 420 may be provided. Left and right handle support frames 430 may be provided. A front cover 440 and a rear cover 450 for installing main parts extending between and are coupled to the pair of handle cover frames 420. A force sensing module 460 and a control board 470 for the third sensor module are installed in an inner space defined by the front cover 440 and the rear cover 450. The force sensing module 460 and the control board 470 for the third sensor module may be connected to the main PCB 152 via signal lines extending therefrom into the handle cover frame 420.

As shown in FIG. 7 to FIG. 9, the handlebar 410 is a straight bar, and can have a cylindrical shape, a square cross section or circular cross section. The handlebar 410 refers to a part that the user grips. When the user grabs the handlebar 410 and pushes the same forwards, the cart robot 10 moves forward. When the user grabs the handlebar 410 and pulls the same backward, the cart robot 10 moves backwards. Alternatively, when the user grabs the handlebar 410 and pushes the same in the left or right direction, the auxiliary wheel 330 pivots in the left or right direction and thus the movement direction of the cart robot 10 is switched to a direction in which the handlebar 410 is pushed. That is, the cart robot 10 can sense the direction of force applied by the user and can assist moving the cart robot in that direction by controlling the in-wheel motors of the main wheels 310. The force of pushing or pulling the handlebar 410 is sensed by the force sensing module 460 and then the sensed force is transmitted to the controller, which in turn may use the sensed force to realize the power assist function. Each handle cover frame 420 is coupled to each of both ends of the handlebar 410. The handlebar 410 and the handle cover frame 420 may be made of an insulating material, such as plastic, so as not to affect the performance of the surrounding sensors.

The handle cover frame 420 is embodied as an 'L' shaped frame. Left and right handle cover frames 420 are provided in a pair manner to support both ends of the handlebar 410, respectively. Each handle support frame 430 may be vertically disposed and have a shape corresponding to a shape of the handle cover frame 420, and is inserted (or positioned) into each handle cover frame 420. In some cases, a connection bracket 422 is inserted into an upper portion of the handle cover frame 420, and a handle support frame 430 is connected to a lower portion of the connection bracket 422. Bottoms of the handle cover frame 420 and the handle support frame 430 are coupled to the upper frame 110. The coupling thereof with the upper frame 110 may be achieved via a separate fastening member, such as a bolt, screw or a pin, or any other fastener. The handle cover frame 420 and the handle support frame 430 are coupled to the inner face of the lower portion of the upper frame 110 so that coupling portions therebetween are not exposed to the outside. The front cover 440 and the rear cover 450 are disposed between the handle cover frames 420 and are coupled to each other to define an accommodation space therebetween.

The front cover 440 and the rear cover 450 can be embodied as plates and can have a same shape, and extend between the handle cover frames 420. The front cover 440 and the rear cover 450 may prevent the internal components from being exposed to the outside. As shown in FIGS. 7-9, the force sensing module 460 and the control board 470 for the third sensor module are received in the accommodation space defined between the front cover 440 and the rear cover 450.

The force sensing module 460 includes a support frame 462 coupled to the front cover 440 and the rear cover 450, a load cell 464 installed on the support frame 462, and a connection frame 466 for connecting the load cell 464 with the handlebar 410.

The support frame 462 has a plate shape having a predetermined area, and supports a pair of load cells 464. One end of each load cell 464 is coupled to each of both sides of the support frame 462. The other end of each load cell 464 is coupled to the connection bracket 422 as described above via the connection frame 466. The force applied to the handlebar 410 is transmitted to the connection frame 466 of the force sensing module 460 via the connection bracket 422 and then is transmitted to the load cell 464.

The pair of load cells 464 are provided and are coupled to both sides of the support frame 462, respectively. The load cell 464 refers to a force sensor for determining a direction of the force applied to the handlebar 410. The load cell 464 is of a bar type. That is, the load cell 464 can be a type of transducer, e.g., a force transducer, that converts a force, such as a force of the user, which may be tension, compression, pressure or torque, into an electrical signal. As described above, one end thereof is coupled to the connection frame 466 and the other end thereof is coupled to the support frame 462.

One end of the load cell 464 coupled to the connection frame 466 is a free end, while the other end thereof coupled to the support frame 462 is a fixed end. Therefore, the free end of the load cell 464 is deformed when a force is applied to the connection frame 466. A resistance value of the load cell 464 may vary based on the deformation of the free end. Thus, the direction of the external force may be determined based on the resistance value.

As used herein, an end of the force sensor being the free end does not mean that the end may move in all directions because the end is not coupled to or fixed to a portion, but means that a portion of the end which is subjected to the force but is not displaced not to affect the deformation is coupled or fixed to a portion.

When the user pushes or pulls the handlebar 410, the handlebar 410 acts a force point to which a force is applied according to a lever principle. Upon receiving the applied force, the load cell 464 acts as an action point. The connection frame 466 serves as a support point for transmitting the force. Therefore, the force applied to the handlebar 410 is transferred to the load cell 464 via the connection frame 466 to deform the load cell 464. Thus, the direction of the force applied to the handlebar 410 may be sensed. A sensing value from the load cell 464 may be transmitted to the controller, and then the controller may sense the direction of the force applied to the handlebar 410 based on the sensing value. The detection of the direction of the force applied to the handlebar 410 is defined as 'force sensing'.

When the user pushes the handlebar 410 forwards, the controller may sense the direction of the force and may determine that the 'power assist' function is necessary to assist the robot 10 to move in the forward direction. The controller may control the in-wheel motor 312 to generate a rotational (e.g., auxiliary) force, which is transmitted to the main wheel 310. Upon receiving the auxiliary force, the main wheel 310 rotates to move the cart robot 10 in a forward direction.

For example, when a force by which the user pushes the cart robot 10 is defined as 10 (e.g., 10%), a force to push the cart robot 10 using the power assist function may be 90 (e.g., 90%). Accordingly, the cart robot 10 moves at the same speed as a speed achieved when the robot is pushed using a force of 100 (e.g., 100%), but a force actually applied thereto by the user is 10. Therefore, since the user may move the cart robot 10 using a small force, an effect of improving the user convenience may be achieved.

In the same manner, when the user pulls the handlebar 410 and moves the robot 10 backwards, the controller may determine that a 'power assist' function to assist the cart robot 10 to move in the backward direction is required. The controller controls the in-wheel motor 312 to generate a rotational (i.e., auxiliary) force, which is transmitted to the main wheel 310. Upon receiving the auxiliary force, the main wheel 310 may move backwards. This power assist function may allow the user to easily move the cart robot 10. The control board 470 as a component of the third sensor module may be installed behind the force sensing module 460.

The control board 470 is configured for providing an automatic following function, and may be installed on the sensor mount portion 112 of the upper frame 110 or on a back face of the support frame 462. The control board 470 may be electrically connected to the controller of the main PCB 152 and may communicate therewith. The control board 470 is installed in a position to avoid signal interference. Further, signal interference and noise generation increase when a metal material is close to the control board

470. For this reason, the basket 210 is preferably spaced apart from the control board 470 by a predetermined distance.

When the material of the basket 210 is an insulating material, such as plastic, the spacing between the control board 470 and the basket 210 is not considered. However, when the basket 210 is made of metal to ensure sufficient strength, the basket 210 should be spaced, by a minimum separation distance, from the control board 470. For example, the minimum separation distance between the control board 470 and basket 210 may be set to 10 cm.

In the above-described embodiment, the basket 210 is spaced apart from the upper frame 110 of the main body 100. Alternatively, the basket 210 may be directly coupled to the upper frame 110 of the main body 100 without the support bracket 230.

As described above, the cart robot according to an embodiment of the present disclosure detects and tracks the location of the transmission module when the user has the transmission module. Thus, the cart robot automatically moves based on the user movement.

Furthermore, the cart robot in accordance with the present disclosure may detect obstacles such as stands in a mart and persons in a distinguishing manner, and, thus, automatically avoid the obstacles and persons when following a location of a transmission module, thus greatly improving user convenience.

The cart robot according to the present disclosure provides an automatic following function and a power assist function, so that the user may easily handle or control the cart robot, thereby greatly improving user convenience.

According to the present disclosure, the battery is disposed on a front side of the main body and, thus, a center of gravity thereof is located at a front location thereof. Thus, the cart robot is not pushed backward even when driving on an inclined moving walkway, thereby to avoid user inconvenience.

Although the present disclosure has been described with reference to the drawings illustrating the present disclosure, the present disclosure is not limited to the embodiments and drawings disclosed in the present specification. It will be apparent that various modifications may be made by those skilled in the art within the scope of the present disclosure. In addition, it should be appreciated that effects to be achieved from configurations of the present disclosure as not expressly mentioned may be acknowledged.

INDUSTRIAL AVAILABILITY

The cart robot according to the present disclosure may be used in various fields such as a commercial field, a leisure field, and a logistics field.

What is claimed is:

1. A cart robot, comprising:
    a battery;
    a basket assembly to receive goods therein;
    a main body coupled to a bottom of the basket assembly to support the basket assembly;
    a handle assembly connected to a rear side of the main body, the handle assembly including:
        a handlebar; and
        a force sensing assembly configured to detect a force applied by a user to the handlebar;
    a wheel assembly rotatably coupled to a bottom of the main body and configured to move the main body in a direction of the force applied to the handlebar using electrical energy supplied from the battery; and
    a main printed circuit board (PCB) having a controller, wherein the main PCB is disposed inside the main body and electrically communicates with the force sensing assembly,
    wherein the force sensing assembly is connected to the main PCB via signal lines extending therefrom into a handle cover frame of the handle assembly, and
    wherein the controller is mounted on the main PCB and is configured to:
        acquire, via the signal lines, a signal based on the detection of the force applied to the handlebar by the user,
        determine the direction of the force applied to the handlebar based on the acquired signal, and
        supply a driving force to an in-wheel motor of the wheel assembly to move the main body in the determined direction of the force applied to the handlebar.

2. The cart robot of claim 1, wherein the wheel assembly includes:
    a pair of main wheels, each main wheel being rotatably coupled to a respective side of the bottom of the main body;
    an auxiliary wheel rotatably coupled to the bottom of the main body closer to a front side of the main body than the pair of main wheels, the front side of the main body being opposite to the rear side of the main body; and
    a pair of in-wheel motors including the in-wheel motor, each in-wheel motor being mounted inside a respective one of the pair of main wheels, and
    wherein each in-wheel motor is electrically connected to the battery and is configured to receive electrical energy from the battery to supply a driving force to the respective main wheel to move the main body in the direction of the force applied to the handlebar.

3. The cart robot of claim 2, further comprising:
    a sensor assembly mounted to the main body, the sensor assembly including a first sensor assembly, a second sensor assembly, and a third sensor assembly,
    wherein the main PCB is provided inside a main housing and communicates with the first sensor assembly, the second sensor assembly, the third sensor assembly, the force sensing assembly and the wheel assembly, and
    wherein the controller is configured to control charging and discharging of the battery and analyze a detection result from the force sensing assembly.

4. The cart robot of claim 1, wherein the main body further includes:
    a main housing having an open top and an accommodation space defined therein, wherein the battery is positioned in the accommodation space; and
    an upper frame coupled to the open top of the main housing to cover the accommodation space and including a bottom face having reinforcing ribs, and
    wherein the main body includes a slit between the main housing and the upper frame.

5. The cart robot of claim 4, further comprising:
    a first sensor assembly including a plurality of sensors respectively provided in the front side and at least a portion of each of left and right sides of the main housing, wherein the first sensor assembly detects an obstacle in front of the cart robot;
    a second sensor assembly positioned in the slit and spaced from the first sensor assembly to detect an obstacle; and
    a third sensor assembly positioned on the upper frame to detect a location of a transmission module of a user, wherein sensing ranges of the first sensor assembly, the second sensor assembly and the third sensor assembly do not overlap each other.

6. The cart robot of claim 5, wherein the first sensor assembly includes a time of flight (TOF) sensor, the second sensor assembly includes a lidar sensor, and the third sensor assembly includes an ultra-wideband (UWB) positioning sensor.

7. The cart robot of claim 5,
wherein the main PCB communicates with the first sensor assembly, the second sensor assembly, the third sensor assembly, the force sensing assembly and the wheel assembly.

8. The cart robot of claim 7, wherein the controller is configured to control the wheel assembly to automatically follow the user based on the location of the transmission module of the user detected by the third sensor assembly and to avoid obstacles while following the user based on the obstacles detected by the first sensor assembly and the second sensor assembly.

9. The cart robot of claim 7, wherein the wheel assembly further includes:
a main wheel rotatably coupled to the main body, and
wherein the in-wheel motor is mounted inside the main wheel and is electrically connected to the battery and configured to receive electrical energy from the battery to supply a driving force to the respective main wheel to move the main body in the direction of the force applied to the handlebar.

10. The cart robot of claim 5, further comprising an elastic bumper coupled to and extending along the front side of the main body and at least a portion of each of right and left sides of the main housing,
wherein the bumper has a front portion disposed in front of the first sensor assembly.

11. The cart robot of claim 1, wherein the force sensing assembly includes:
a pair of load cells to sense a magnitude and the direction of the force applied to the handlebar, each load cell being positioned below the handlebar and adjacent to a respect end of the handlebar;
a pair of connection frames connecting the load cells to the handlebar; and
a support frame coupled to the pair of load cells.

12. The cart robot of claim 11, wherein each load cell among the pair of load cells has a first end coupled to the support frame as a fixed end, and has a second end coupled to each connection frame as a free end.

13. A cart robot, comprising:
a battery;
a basket assembly to receive goods therein;
a main body coupled to a bottom of the basket assembly to support the basket assembly;
a handle assembly connected to a rear side of the main body, the handle assembly including:
a handlebar; and
a force sensing assembly configured to detect a force applied by a user to the handlebar;
a wheel assembly including:
a main wheel; and
an in-wheel motor mounted inside the main wheel and configured to apply a driving force to the main wheel; and
a main printed circuit board (PCB) having a controller, wherein the main PCB is disposed inside the main body and electrically communicates with the force sensing assembly, wherein the force sensing assembly is connected to the main PCB via signal lines extending therefrom into a handle cover frame of the handle assembly, and
wherein the controller is mounted on the main PCB and is configured to:
acquire, via the signal lines, a signal based on the detection of the force applied to the handlebar by the user,
determine a direction of the force applied to the handlebar based on the acquired signal, and
supply the driving force to the in-wheel motor of the main wheel in the determined direction of the force applied to the handlebar.

14. The cart robot of claim 13, wherein the main body further includes:
a main housing having an open top and an accommodation space defined therein, wherein the battery is positioned in the accommodation space; and
an upper frame coupled to the open top of the main housing to cover the accommodation space and including reinforcing ribs covering a bottom face of the upper frame, and
wherein the main body includes a slit between the main housing and the upper frame.

15. The cart robot of claim 14, further comprising:
a first sensor assembly including a plurality of sensors respectively provided in a front side of the main housing and at least a portion of each of left and right sides of the main housing, wherein the first sensor assembly detects an obstacle in front of the cart robot;
a second sensor assembly positioned in the slit and spaced from the first sensor assembly to detect an obstacle; and
a third sensor assembly positioned on the upper frame to detect a location of a transmission module of a user,
wherein sensing ranges of the first sensor assembly, the second sensor assembly and the third sensor assembly do not overlap each other.

16. The cart robot of claim 15, wherein the first sensor assembly includes a time of flight (TOF) sensor, the second sensor assembly includes a lidar sensor, and the third sensor assembly includes an ultra-wideband (UWB) positioning sensor.

17. The cart robot of claim 15, wherein the controller is configured to control the wheel assembly to automatically follow the user based on the location of the transmission module of the user detected by the third sensor assembly and to avoid obstacles while following the user based on the obstacles detected by the first sensor assembly and the second sensor assembly.

18. The cart robot of claim 15, wherein the main PCB is provided inside the main housing, and communicates with the first sensor assembly, the second sensor assembly, the third sensor assembly, the force sensing assembly and the wheel assembly.

19. The cart robot of claim 13, wherein the handle assembly is disposed at the rear side of the main body, and
wherein the force sensing assembly includes:
a pair of load cells to sense a magnitude and a direction of the force applied to the handlebar, each load cell being positioned below the handlebar and adjacent to a respect end of the handlebar;
a pair of connection frames connecting the load cells to the handlebar; and
a support frame coupled to the pair of load cells.

20. The cart robot of claim 19, wherein each load cell has a first end coupled to the support frame as a fixed end, and has a second end coupled to each connection frame as a free end.

* * * * *